United States Patent [19]

Yang

[11] Patent Number: 5,489,001

[45] Date of Patent: Feb. 6, 1996

[54] DIFFERENTIAL COUPLING AND COMPOUND POWER SYSTEM FOR A VEHICLE

[76] Inventor: Tai-Her Yang, 5-1 Taipin St., Si-Hu Town, Dzan-Hwa, Taiwan

[21] Appl. No.: 87,269

[22] Filed: Jul. 8, 1993

[51] Int. Cl.⁶ ........................ B60K 1/00
[52] U.S. Cl. .................. 180/65.2; 180/65.4; 318/587
[58] Field of Search .............. 180/65.1, 65.2, 180/65.3, 65.4, 65.6, 65.7, 65.8; 364/424.01, 431.01; 318/587; 60/715, 718, 716; 74/665 C, 665 E, 665 K

[56] References Cited

U.S. PATENT DOCUMENTS

| | | | |
|---|---|---|---|
| 4,318,449 | 3/1982 | Salisburg | 180/65.4 |
| 4,346,303 | 8/1982 | Bukatarevic | 180/65.4 |
| 4,470,476 | 9/1984 | Hunt | 180/65.3 |
| 4,923,025 | 5/1990 | Ellers | 180/65.4 |
| 5,301,764 | 4/1994 | Gardner | 180/65.4 |
| 5,327,987 | 7/1994 | Abdelmalek | 180/65.4 |

*Primary Examiner*—Richard M. Camby
*Attorney, Agent, or Firm*—Bacon & Thomas

[57] ABSTRACT

The present invention is directed to a differential coupling and compounding power system for use in a hybrid driven vehicle. The system includes a primary power source that includes an output shaft connected to a magnetic coupling and driving device. A magnetic coupling driving device can be driven by the output shaft of the engine so as to act as an alternator for charging a battery unit of the vehicle, can function as a motor to drive the vehicle while receiving power from the battery unit and can drive the vehicle in unison with the engine such that a compound power system is provided. The magnetic coupling and driving device can also function to develop a load on the engine in order to act as a vehicle brake.

16 Claims, 6 Drawing Sheets

DIFFERENTIAL COUPLING AND COMPOUND POWER SYSTEM FOR A VEHICLE

BACKGROUND OF THE INVENTION

1. Field of the Invention

The present invention pertains to a differential coupling and compounding power system for use in driving vehicles, such as automobiles, ships, aircrafts, industrial equipment and the like. More particularly, the invention is directed to a driving system that incorporates a primary gyroscopic power source and a magnetic coupling and driving device which can be used to individually or simultaneously control the output drive of the vehicle.

2. Discussion of the Prior Art

In recent years, energy and noise pollution have become extremely serious problems for power driven vehicles. Much attention has been given to producing energy and noise efficient electric vehicles. Even though a substantial amount of research and development has been done on such power vehicles, not that much has been accomplished in this area mainly because the capacity of known batteries are limited. If the volume of the battery is increased to fully meet output requirements, more power will be wasted in driving the vehicle because the weight of the vehicle would have to be increased due to the number of batteries needed. Providing an electric vehicle with a sufficient power source substantially comparable to the power obtainable through other known power sources including internal combustion engines is not proven to be economically feasible. Due to these problems, advancements in vehicle drives have recently concentrated on hybrid-type driving devices.

The most typical type of electric vehicle utilizing a hybrid drive is one which utilizes an internal combustion engine to drive a generator so as to produce power for charging the automobile's battery unit and then the battery unit supplies power to drive motors associated with the wheels of the vehicle. Although this type of vehicle has associated pollution reductions, it is simply not considered to be efficient enough.

Another type of vehicle hybrid drive system utilizes the power output shaft of an engine to drive a rotatable shaft of a driving motor by means of a series of clutches. The engine and motor are coaxially aligned and the series of clutches are selectively shifted to drive the car and control its speed. In this arrangement, either the engine or the motor can be chosen to output driving power, but the two power sources do not operate simultaneously.

Based on the above, it should be readily apparent that there exists a need in the art for a compound power system which can be used to drive a vehicle in a more energy and noise efficient manner.

SUMMARY OF THE INVENTION

The present invention is directed to a differential coupling and compounding power system for Use in driving a vehicle. The system includes a primary power source that includes an output shaft connected to a magnetic coupling and driving device. The magnetic coupling and driving device can be driven by the output shaft of the engine so as to act as an alternator for charging a battery unit of the vehicle, can function as a motor to drive the vehicle while receiving power from the battery unit and can drive the vehicle in unison with the engine such that a compound power system is provided. The magnetic coupling and driving device can also function to develop a load on the engine in order to act as a vehicle brake.

According to a first embodiment of the invention, the magnetic coupling and driving device can be constituted by a brush or brushless alternator or direct current dynamo that is interconnected with the engine output shaft through a differential gear coupling. In a second embodiment of the invention, the magnetic coupling and driving device includes a rotor which is directly connected to the output shaft of the engine. In any of these embodiment, either the engine output shaft or the output of the magnetic coupling and driving device can produce output power for driving the vehicle. In addition, the output power and speed can be added to each other. Due to this arrangement, the volume of the system can be small and compact, while minimizing associated costs. A control device is utilized to select the operating state of the magnetic coupling and driving device. The magnetic coupling and driving device can also be utilized to provide an initial torque to the engine to start the engine.

By utilizing a differential coupling and compound power system in accordance with the present invention, a hybrid electric vehicle can be produced wherein the size of the engine can be minimized and can operate at a constant speed or a partially modulated speed to lower pollution effects and any associated reduction in power output can be supplemented by the magnetic coupling and driving device. When the vehicle is operating in an inefficient mode such as during vehicle braking, the associated differential speed output can be used to charge the vehicle battery unit through the magnetic coupling and driving device and when the additional power output from the engine is not necessary, the magnetic coupling and driving device can solely drive the vehicle such that a more energy efficient and pollution conscious system is provided.

Additional features and advantages of the present invention will become more readily apparent from the following detailed description of the preferred embodiments thereof when taken in conjunction with the accompanying drawings wherein like reference numerals refer to corresponding parts in the several embodiments described.

DETAILED DESCRIPTION OF THE PREFERRED EMBODIMENTS

Figure 1:
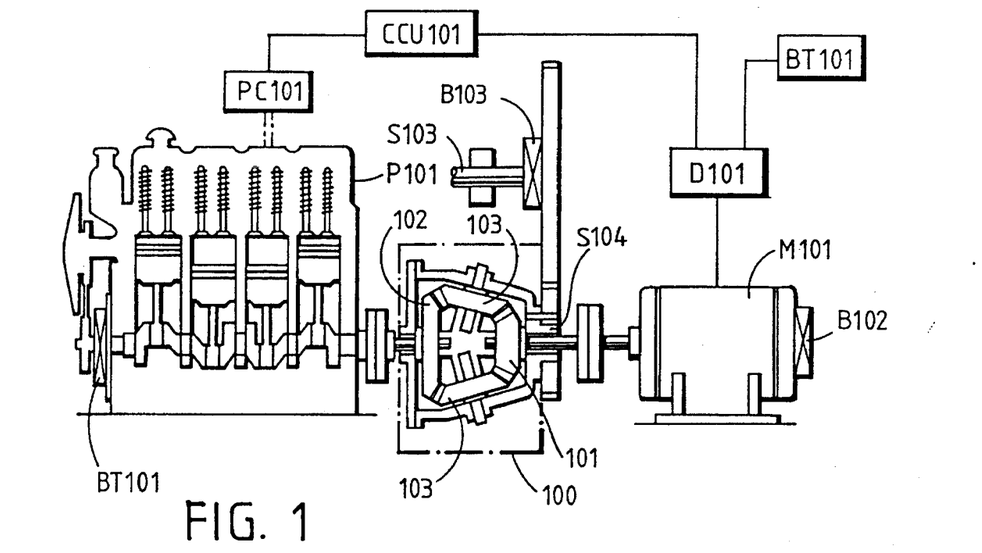
FIG. 1 schematically depicts a differential coupling and compound power system in accordance with a first preferred embodiment of the invention.

FIG. 1 is an embodiment of the differential coupling and compounding power system of electric transmission storing type which is reacting for a differential coupling through a differential gear. The main structure in FIG is as follows:

Primary side gyroscopic power source P101: It is usually an internal combustion engine, but in practical use, the external combustion engine, wind and water power, and other gyroscopic power source can also be used. The primary side gyroscopic power source has a brake B101 for the need of operation system to lock the primary side gyroscopic output shaft. The primary side gyroscopic power source also has a speed or power controller PC101 (e.g. it is used as the oil controller when the internal fire engine is used as a primary side gyroscopic power source) so as to receive manual or the CCU101 control;

Differential gear 100: it includes the sun gear 101 of the magnetic coupling driving device; it is composed of the outer ring gear 102 of the primary side gyroscopic power source and the loose star gear 103 for the differential output. The loose star gear has an output coaxial shaft S104:

Magnetic coupling driving device M101: it has rotors and magnetic field and in system operation it can be used as a motor when power is input, or as a generator to charge a battery when the inertia of the system is turned into electric power, or by means of the distribution of the differential gear it can receive the driving motive force of part of the primary side gyroscopic power source and can be used as a generator to charge a batter. It and the system output load are together formed into a load of the primary side gyroscopic power source. By means of adjusting the power for the battery, it can adjust the turning speed difference between the system output load and the primary side gyroscopic power source, especially when the power source is an engine. In this way, the engine can operate better and keep to control the turning speed of the load driving: the magnetic coupling device M101 provides a damping to drive the engine directly, it can use the magnetic coupling driving device as a generator to output a constant current which provides a reproduced power brake damp, or add a brake device B102 between the gyroscopic field of the magnetic driving device and the turnable rotors so as to provide a mechanic brake; the magnetic coupling driving device and the structure of turnable rotors are comprised of generator and dynamo, which consist of constant magnetic or coil exciting fields and rotors of constant magnetic iron or slide ring conductive coil rotors, or consists of series wound, shunt wound, or multiple wound, or synchronizing brushless dynamo or stepping dynamo;

Control element D101 of magnetic coupling driving device: It can receive orders from CCU101 to supply power to control charge or discharge the voltage and current between the magnetic coupling driving device and battery and to control the armature constant current output and the magnetic coupling driving device itself provides a magnetic brake damping:

Battery BT101: al kinds of battery which can charge and discharge power;

Output shaft S103: a gyroscopic output end of the system for a driving load, when necessary a brake B103 can be attached on it, and in the following system operation, the system load can be used as a damping or further used together with a brake B103 as a damping supplier;

CCU101: It consists of solid circuit or dynamo elements to receive manual or signal control order so as to control the system and act out the whole or part of the function as following Table 1:

The function Table 1 of the FIG. 1 are as follows:

F1-A, F1-B, F1-C, F1-D: a system operation for load lower speed output driving;

F2: a system operation for battery power input magnetic driving device for motor operation to drive load;

F3: a system operation for driving engine and battery power input coupling driving device for motor operation to reach the output turning speed and power increasing as a big power output;

F4: a system operation for load side mechanic motive power feedback driving magnetic coupling driving device as a generator for receiving power back into battery;

F5: a system operation for engine driving magnetic coupling driving device for generator charging the battery; this function can further control the charging time automatically in advance;

F6: a motor operation for a magnetic coupling driving device by means of battery power to drive a motor and start an engine.

TABLE 1

| Element/Function | | B101 | B102 | B103 | P101 | (M101) G/M | BT101 |
|---|---|---|---|---|---|---|---|
| F1-A | B102 closed for controlling engine oil valve from low speed control driven to medium speed. | OFF | ON | OFF | 0-MAX | STOP | STOP |

TABLE 1-continued

| Element/Function | | B101 | B102 | B103 | P101 | (M101) G/M | BT101 |
|---|---|---|---|---|---|---|---|
| F1-B | M101 and engine oil valve controlled from low speed to medium speed and charging at the same time. | OFF | OFF | OFF | 0-MAX | GEN. | CHARGE |
| F1-C | M101 controlled by the engine constant speed for changing the load output power of the current charged to the battery. | OFF | OFF | OFF | CONSTANT SPEED | GEN. | CHARGE |
| F1-D | M101 controlling output speed by a short cut. | OFF | OFF | OFF | CONSTANT SPEED | GEN. | STOP |
| F2 | Battery power drives M101 to transmit and output forward and backward. | ON | OFF | OFF | STOP | MOTOR | DIS-CHARGE |
| F3 | M101 controlled and the engine rotated to add speed and power of the motor to each other. | OFF | OFF | OFF | MAX | MOTOR | DIS-CHARGE |
| F4 | M101 as a generator for receiving motive force and turning it into power for charging the battery. | OFF ON | OFF OFF | OFF OFF | SLOW STOP | GEN. GEN. | CHARGE CHARGE |
| F5 | System charged automatically (stop at a set time) | OFF | OFF | ON | 0-MAX | GEN. | CHARGE |
| F6 | M101 as an engine to start motor | OFF | OFF | ON | START | | |

Note:
(1) Charge of F1-B is distribute for current according to the load.
(2) M101 a magnetic coupling driving device.
(3) P101 and M101 series is a primary side gyroscopic power source; e.g. engine
(4) BT101 a battery.

Figure 2:
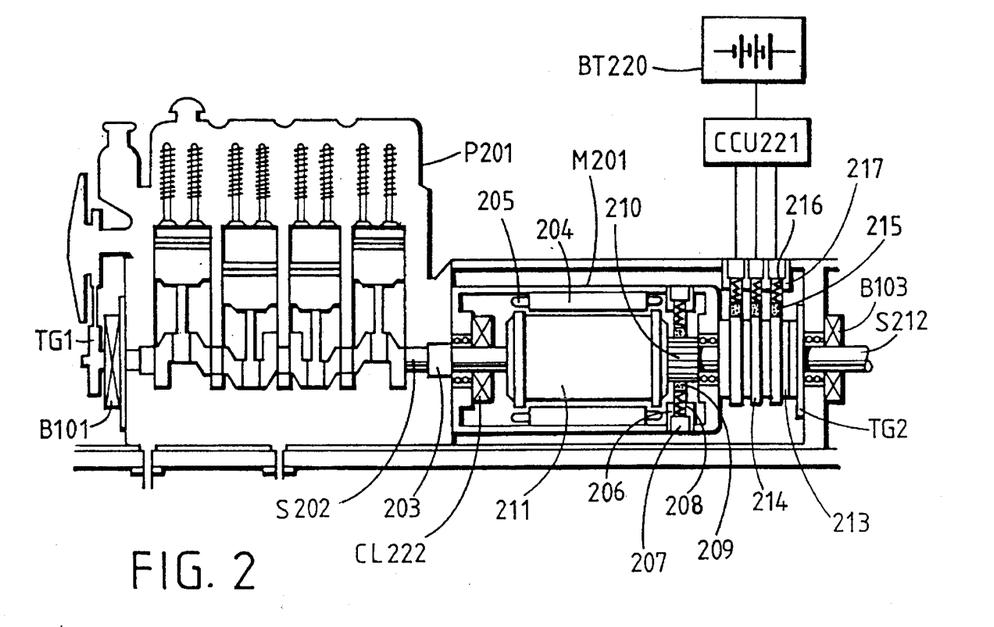
FIG. 2 depicts a differential coupling and compound power system in accordance with a second embodiment of the invention.

FIG. 2 is an embodiment of the differential coupling and compounding power system of electric transmission storing type which is formed by means of dual motive magnetic coupling driving device.

It is directly connected to a input shaft of a magnetic coupling driving device through a gyroscopic output shaft of an internal fire engine or through a transmission gear, belt, chain, or coupler. the magnetic coupling driving device is a dual end shaft of which either end is respectively connected to a turnable magnetic field and turnable rotors so as to be controlled by a control device and to generate the driving function of a motor when current is input; or it is used to generate power and output power and produce the transmission coupling function through coupling torsional moment of output current, or to startan engine and to brake the reproducing power, when the engine is soly rotated to output driving load or rotate with the engine to output driving load; for example, when engine is soly driven, it can be used as a transmitable coupling device, and there provided a magnetic or liquid or mechanic driving clutch between gyroscopic magnetic field and turnable rotors to act out a coupling between magnetic field and rotors so as to transmit directly and to control the speed by controlling the engine when it is closed. The main structure of the FIG. 2 can be illustrated as follow:

internal fire engine P201 is driven by the materials such as gasoline, disel, alcohol, gas, and hydrogen:

primary output shaft S202 of internal combustion engine:

coupler 203: it can be a board coupler, univeral joint, or other conventional shaft-to-shaft or shaft-to-coaxial gyroscopic coupling devices;

turnable driving field 204 of the magnetic coupling driving device M201: a fixed mechanic structure which has a bearing and can bear this structure by means of coupler 203 directly coupled to the internal combustion engine primary gyroscopic output shaft S202, or by means of the transmission devices, such as gear, belt, and chain so as to receive the driving of the engine output shaft;

constant magnetic exciting coil 205: it is controlled by the CCU221, and is conducted to an exciting magnetic current which can control its polarity and current volume input through a conductive ring, or further, it consists of A.C. OR d.c. converter dynamo of constant magnetic iron field, or brushless synchronical or differential dynamo.

insulated sleeve of armature conductive brush seat 206;

cap of armature conductive brush seat 207;

armature conductive brush seat 208;

armature conductive brush 209;

gyroscopic armature exchanger 210: if the magnetic coupling device is a converter dynamo for rotors to change phase and for conduction, its structure can be cylindric or board, and its brush and brush seat are fixed at its outside or side;

turning rotor 211: it can be a converter armature and a cylindrical D.C. armature having a conventional coil and tooth iron core, or a printing armature rotor structure, or a cup armature rotor structure, or a iron coreless armature rotor structure, or other A.C. or D.C. dynamo structure, if it is a brushless one, it contains constant magnetic iron;

output shaft of armature rotor S212;

conductive slip ring insulated sleeve 213;

armature and magnetic field output/input conductive ring 214: respectively connected to armature output/input conductive brush seat and connected to both ends of the magnetic field exciting magnetic coil; if it is a brushless one, the brush and brush seat can be omitted when necessary;

coupled to brush 215 of conductive ring;

coupled to brush seat 216 of conductive ring;

coupled to conductive ring brush insulated seat 217;

internal fire engine primary output shaft magnetic brake B101: it connects with the output shaft through keys or pins and has braking function when it has power; it can be replaced by a mechanic braking device in a manual, hydrostatic, air or oil pressure way of operation, and it can be used when a driving is necessary;

output side magnetic brake device B103 of the magnetic coupling driving device M201: it connects with the output shaft through keys or pins and has braking function when it has power; it can be replaced by a mechanic braking device in a manual, hydrostatic, air or oil pressure way of operation, and it can be used when a driving is necessary;

battery BT220: it can also choose any kinds of charging an discharging battery or fuel battery;

TABLE 2

| Element/Function | | B101 | CL222 | B103 | P201 | (M201) G/M | B1220 |
|---|---|---|---|---|---|---|---|
| F1-A | CL222 closed for controlling engine oil valve from low speed control driven to medium speed. | OFF | ON | OFF | 0-MAX | STOP | STOP |
| F1-B | M201 and engine oil valve controlled from low speed to medium speed and charging at the same time. | OFF | OFF | OFF | 0-MAX | GEN. | CHARGE |
| F1-C | M201 controlled by the engine constant speed for changing the load output power of the current charged to the battery. | OFF | OFF | OFF | CONSTANT SPEED | GEN. | CHARGE |
| F1-D | M201 controlling output speed by a short cut. | OFF | OFF | OFF | CONSTANT SPEED | GEN. | STOP |
| F2 | Battery power drives M201 to transmit and output forward and backward. | ON | OFF | OFF | STOP | MOTOR | DIS-CHARGE |
| F3 | M201 controlled and the engine rotated to add speed and power of the motor to each other. | OFF | OFF | OFF | MAX | MOTOR | DIS-CHARGE |
| F4 | M201 as a generator for receiving motive force and turning it into power for charging the battery. | OFF ON | OFF OFF | OFF OFF | SLOW STOP | GEN. GEN. | CHARGE CHARGE |
| F5 | System charged automatically (stop at a set time) | OFF | OFF | ON | 0-MAX | GEN. | CHARGE |
| F6 | M201 as an engine to start motor | OFF | OFF | ON | START | | |

Note:
(1) Charge of F1-B is distribute for current according to the load.
(2) M201 a magnetic coupling driving device.
(3) P201 and M201 series is a primary side gyroscopic power source; e.g. engine.
(4) B1220 a battery.

engine speed feedback speed-inspecting generator TG1: it is deviced when necessary, and it is coupled to primary output shaft and can produce an analog or digital signal for the engine speed by means of the electric or magnetic effect, and a transmission device which has a positive contrast with the engine speed can be selected to replace its coupling position;

output shaft speed generator TG2: it is deviced when necessary, and it is a coupled to output side armature rotor output shaft or to a driving gear at a position where the rotating speed of the output shaft is in positive contrast with its driving gear, and can produce an analog or digital signal for the engine speed by means of the electric or magnetic effect;

central control unit CCU221: it is comprised of conventional switch, potential device, photoelectric device, solider dynamo element, micro-computer, including control element and driving interface unit;

clutch device CL222 between gyroscopic field of magnetic coupling driving device M201 and turnable rotor: It is controlled by the magnetic, fluid, or mechanic force, when OFF is open, magnetic field and rotor will rotate to each other, when ON is closed, magnetic field and rotor will be directly locked and transmitted.

Other circumferential device, such as magnetic oil valve adjustment driving device, which can be deviced when necessary; its engine rotates in constant speed by means of the feedback of TG1 so as to adjust the driving for the oil valve; auxiliary generator can be a D.C. or A.C. generator by means of a converter, it also can receive the driving of an engine to produce power through belt, or other transmission devices; voltage converter automatically controls the generator in different engine speed to produce a stable charging voltage for charging a battery.

Figure 3:
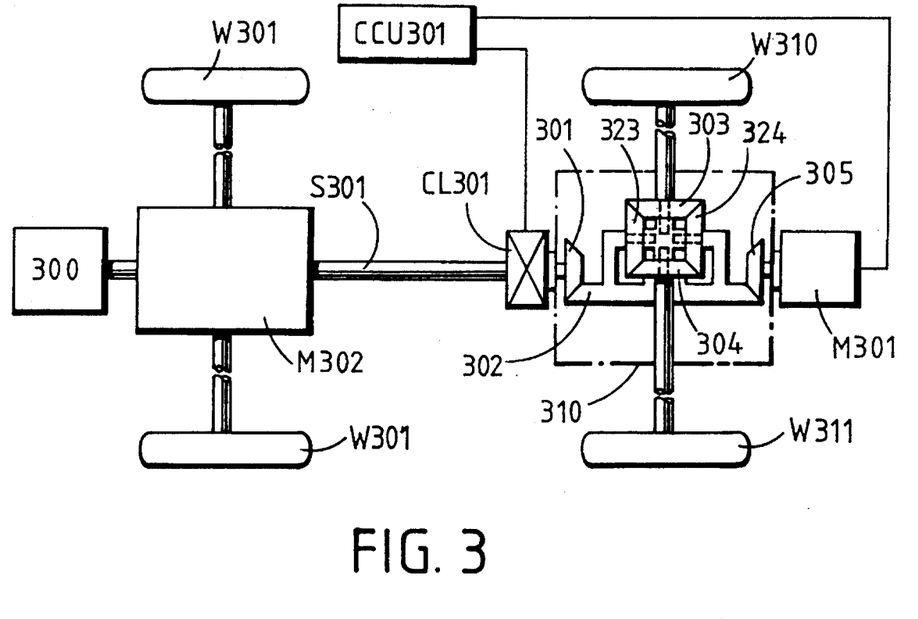
FIG. 3 schematically illustrates a differential coupling and compounding power system in accordance with a third embodiment of the invention for use in a vehicle having two or four wheels selectively driven.

FIG. 3 is an embodiment of the differential coupling an compounding power system of electric transmission storing type which is in cascade load.

FIG. 3 can be mainly illustrated as follows:

primary side gyroscopic power unit 300: it is an internal fire engine:

front end load W301: it is a two units of front wheel driven and ground driving damping load or other load;

central gear box and transmission device and operation mechanism interface of front load M302 (including automatical or manual gearing control system of transitional front wheel transmission): except for the driving front end load, it has a backward extending unit or more than a unit of central shafts S301 which has an output rotating number of the front end load with an adequate rotating speed rate, (similar to the rear wheel transmission central shaft of the backward extending four wheel transmission), its traits are a controllable clutch CL301 is fitted between the central shaft and the rear end differential gear box so as to transmit the primary side gyroscopic motive force to the rear differential speed gear box, or to transmit the motive force from the rear end differential gear box to the front end load, or to make the two motive forces transmitted to each other, or its clutch is a manual, fluid, mechanic, controllable one, or an electrically controlled magnetic one;

rear end differential gear box 310: a small gear 301 receives the driving of a clutch and moves a matched big gear 302, which is connected with two differential gears 323, 324, respectively driving two output gear 303, 304 and two loads W310, W311 moved by two output shafts: big gear 302 is matched with two small gears for two power sources, wherein front end small gear 301 for clutch CL301 is led to primary gyroscopic power unit, a small gear 305 coupled to rear end is led to magnetic coupling driving device M301;

magnetic coupling driving device M301: a driving motor comprised of A.C. or D.C. brush or brushless dynamo armature for a driving load provided by the small gear 305 driven and matched by the big gear 302 of a differential gear system, if the motor chosen can change the mechanic feedback power into electric power as a kind of reproduced power, it can produce a damping by means of the reproduced power; this device M301 has a trait that the smaller the load the higher the speed, a mechanic trait of series wound, or auxiliary multiple wound auxiliary dynamo, or a current value controlled (including constant current control) A.C. or D.C. brush or brushless dynamo so as to have a function of a control value increasing according to the load, so that the following F14 function and the primary side gyroscopic power source are driven together to increase the torsional moment for an auxiliary driving;

central control unit CCU301: it is a reference to a load state (e.g. oil valve state) and a driving state (e.g. speed) of an operative order and primary side gyroscopic power source so as to control magnetic coupling driving device as to a generator, a motor, or a break idle state, and CCU301 is secured to or loose to the clutch CL301 by a control.

Figure 3A:
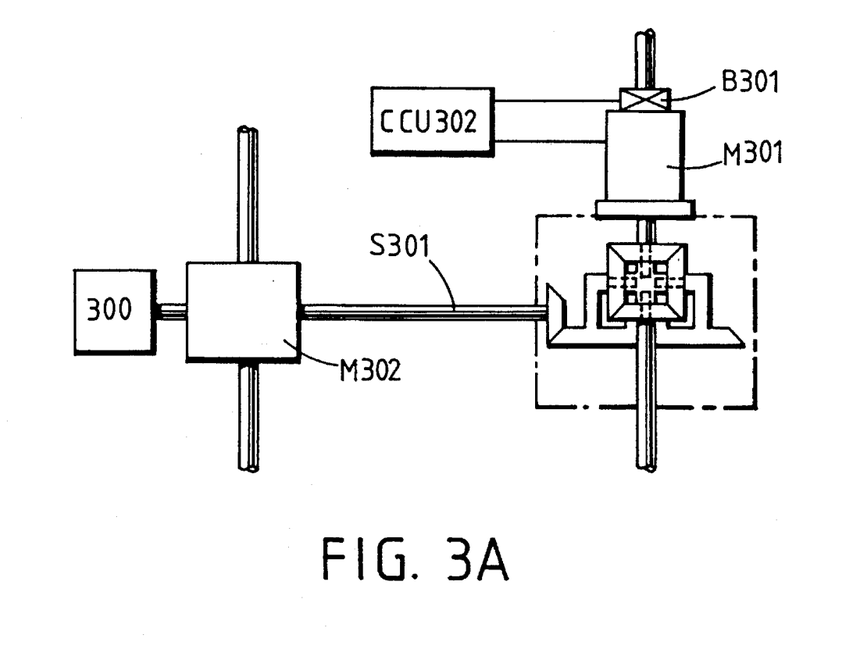
FIG. 3A illustrates another differential coupling and compound power system also for use in a 2WD/4WD vehicle.

The system has the following functions in addition to the above-mentioned function:

F11: primary side gyroscopic power source directly drives the front end load: at this time, clutch CL301 is loose;

F12: primary side gyroscopic power source drives the front end load and the rear differential gear input motive force at the same time: at this time, clutch CL301 is close;

F13: primary side gyroscopic power source only drives the rear end differential gear input power; at this time, clutch CL301 is loose; and the front end operative mechanism interface M302 is idle to the front end load gear;

F14: magnetic coupling driving device M301 and primary side gyroscopic power source drives at the same time all the load; at this time, clutch CL301 is close;

F15: magnetic coupling driving device M301 drives the rear end differential gear output load; at this time, clutch CL301 is loose;

F16: magnetic coupling driving device M301 drives the front end load and differential gear output load at the same time all the load; at this time, clutch CL301 is close;

FIG. 3 is another embodiment which has a changed design as follows:

when original two load ends of the rear end differential gear is output at only one end, the device M301 can be coupled to one of the load ends of the differential gear box, and led to the load from another end, at this time the operation of the system is the same as illustrated in FIG. 2, and in addition to using the reverse moment of output current from self-generating power as a damping, device M301 can also use a brake B301 on a magnetic coupling driving device for controlling its turning part to lock or control the gyroscopic output, and the clutch between central shaft S301 and rear end load can be omitted. The device M301 and brake B301 are controlled by CCU302, when driving direction is reverse, it can be regarded as the front end load being replaced by the rear end load; FIG. 3A is an embodiment of the differential coupling and compounding power system and structure of electric transmission storing type which is output from rear shaft and one side.

Figure 4:
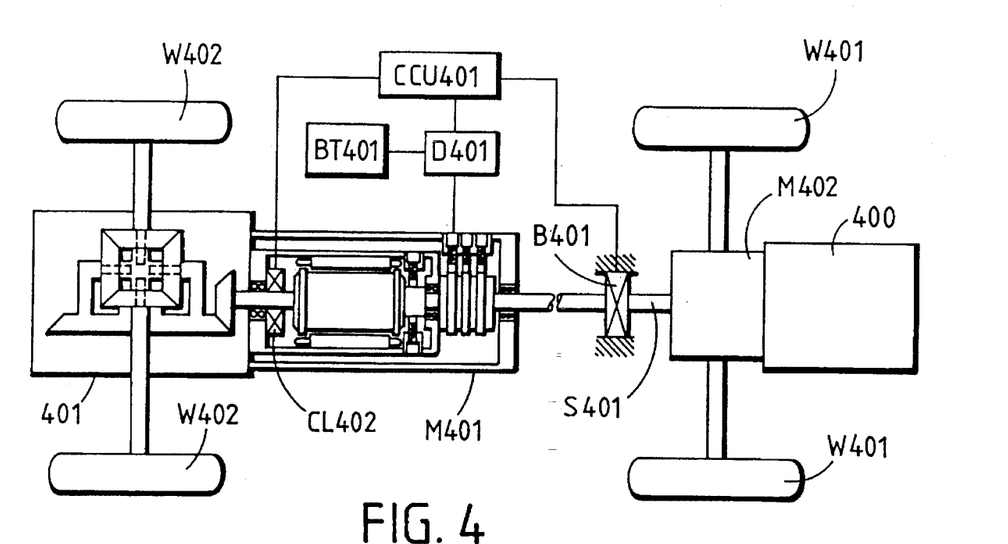
FIG. 4 illustrates another differential coupling and compound power system constructed in accordance with a fourth embodiment of the invention.

FIG. 4 is another embodiment of the differential coupling and compounding power system of electric transmission storing type which is in cascade load. Its primary side gyroscopic power source output drives the front end load and then is output to one of the two end shafts of magnetic coupling driving device, and the other end of the device is directly conducted to rear end load or through a transmission element, or through a differential gear to a load needed for differentiality (e.g. double unit rear wheels).

The embodiment in FIG. 4 comprising:

primary side gyroscopic power unit 400: it is an internal fire engine;

front end load W401: it is a two unit driven front wheel and a ground driving damp, or other load;

central gear box and transmission device and operation mechanism interface of front load M402 including automatical or manual gearing control system of transitional front wheel transmission): except for the driving front end load, it has a backward extending unit or more than a unit of central shafts S401 which has an output rotating number of the front end load with an adequate rotating speed rate, (similar to the rear wheel transmission central shaft of the backward extending four wheel transmission), its traits are a controllable clutch B401 is fitted between the central shaft and the fixed case so as to be controlled by CCU401;

magnetic coupling driving device M401: it is a double end shaft structure including a turnable magnetic field and a turnable rotor, the turnable magnetic field and the turnable rotor are respectively connected with a transmission central shaft and an input shaft of rear end differential gear box 401 so as to drive differential load W402 on both sides; a clutch CL402 controlled by CCU401 is fitted between the turnable magnetic field and the turnable rotor, and it directly enables these two to have mechanical lock at the same time: this device has a mechanical trait that the smaller the load the higher the speed and that a mechanical trait of series wound, or auxiliary multiple wound auxiliary dynamo, or a current value controlled A.C. or D.C. brush or brushless dynamo so as to have a function of a control value increasing according to the load, and it is driven and controlled by the driving circuit D401; the driving circuit device D401 is disposed between magnetic coupling driving device M401 and the battery BT401; it receives the control of the control order of CCU401 so that it can control the magnetic coupling driving device for a motor or a dynamo; and the CCU401 outputs its control order to drive circuit device D401 according to its control order and the operative state of the primary side gyroscopic power unit 400.

The system has the following new functions in addition to the above-mentioned functions of Table I:

F21: primary side gyroscopic power source drives the front end load; at this time, magnetic coupling driving device M401 is at break;

F22: primary side gyroscopic power source only drives the rear end load; at this time magnetic coupling driving device M401 is in a state of generating power or clutch CL402 is close, and front end control interface M402 is idle;

F23: primary side gyroscopic power source drives the front end and the rear end load at the same time; at this time, magnetic coupling driving device M401 has power and acts as a motor;

F24: primary side gyroscopic power source only drives the rear end load; at this time, magnetic coupling driving device M401 has power and acts as a motor; and brake B401 is close;

F25: magnetic coupling driving device M401 drives at the same time both the front and the rear end load: at this time, magnetic coupling driving device M401 has power and acts as a motor.

Figure 5:
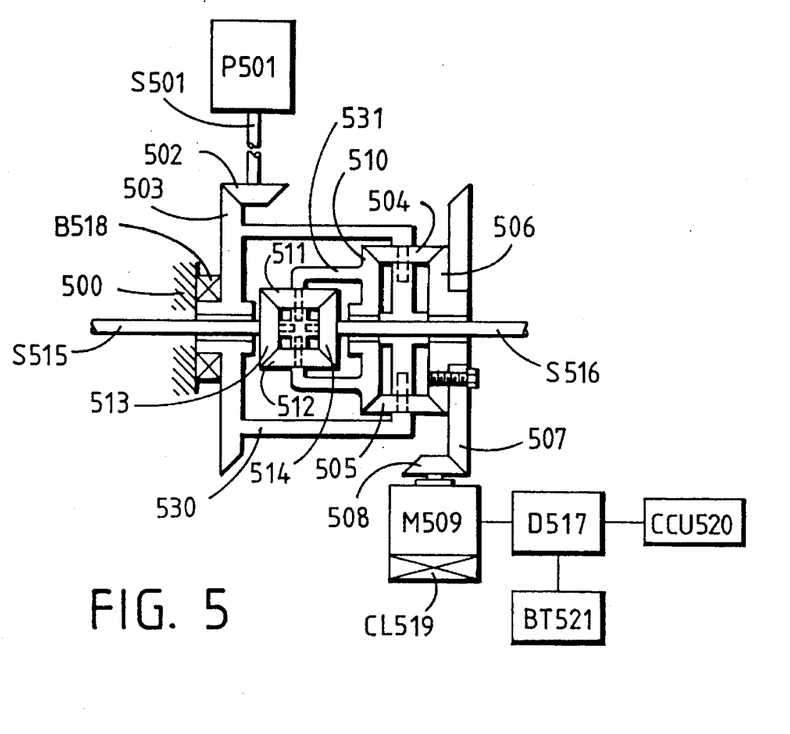
FIG. 5 illustrates an embodiment of the differential coupling and compounding power system of the present invention which incorporates a dual differential gearing arrangement.

FIG. 5 is an embodiment of the differential coupling and compounding power system of electric transmission storing type which is formed by means of series dual differential gears. It has a first differential gear moved by a input shaft and a second differential gear moved by magnetic coupling driving device M401 and it drives according to the total and difference between these two gears, and drives two output wheel and output shaft to issue differential output; it is comprised of:

primary side gyroscopic power source P501: it is an internal combustion engine or other gyroscopic power source;

input shaft S501: It provides a primary side gyroscopic power source and moves a small gear 502 to move a big gear 503;

big gear 503: it is driven by a small gear 502 and it can move the frame 530 of the differential gear 504, 505 of the first differential gear system, and further move the differential gear 504, 505, and it can drive the differential gear 510 together with the second differential gear 506 according to the total and difference between these two gears;

the second differential gear 506: It combines the second input big gear 507 to match with the second input small gear 508, the second input small gear 508 receives the positive or negative rotating driving of the magnetic coupling driving device M509, or on the contrary, the input small gear 508 can move the magnetic coupling driving device M509 to act as a generator;

differential gear 510: it uses the frame 531 to move the differential gears 511, 512 of the second differential gear unit and then move the output differential gears 513, 514 and further move two output shaft S515, S516 so as to act differential output;

the magnetic coupling driving device M509: It has a trait that the smaller the load the higher the speed, a mechanic trait of series wound, or auxiliary multiple wound auxiliary dynamo, or a current value controlled (including constant current control) A.C. or D.C. brush or brushless dynamo so as to have a function of an increase of the torsional moment, it has a brake CL519 for an operation of locking or loosing;

Brake B518: it is provided at the static housing of the system and at the input end of the primary side gyroscopic power source, in the example, it is fitted between big gear 503 and the housing 500;

driving circuit D517: It can receive the order of CCU520 to control magnetic coupling driving device to act as generator or a motor, or by means of controlling the output current value (including preset current) between the battery BT521 and the magnetic coupling driving device M509 to help drive the value-increasing torsional moment for the load, or by means of controlling the magnetic coupling driving device to charge current for the batter BT521 to make magnetic coupling driving device M509 have a damping;

central control unit CCU520: It is comprised of a dynamo and a solid electronic element, it is a reference to a load state (e.g. oil valve state) and a driving state (e.g. speed) of an operative order and primary side gyroscopic power source so as to control magnetic coupling driving device as to a generator, a motor, or a break idle state.

And CCU520 is secured to or loose to the clutch CL519 and brake B518 by a control, the situation of the control can be illustrated as follows:

(1) magnetic coupling driving device drives the load or generates power to reproduce braking: at this time, brake B518 is close:

(2) primary side gyroscopic power source drives the load; at this time, clutch CL519 is close;

(3) primary side gyroscopic power source and the magnetic coupling driving device both drive at the same time all the load; at this time, brake B518 and clutch CL519 are loose.

Figure 6:
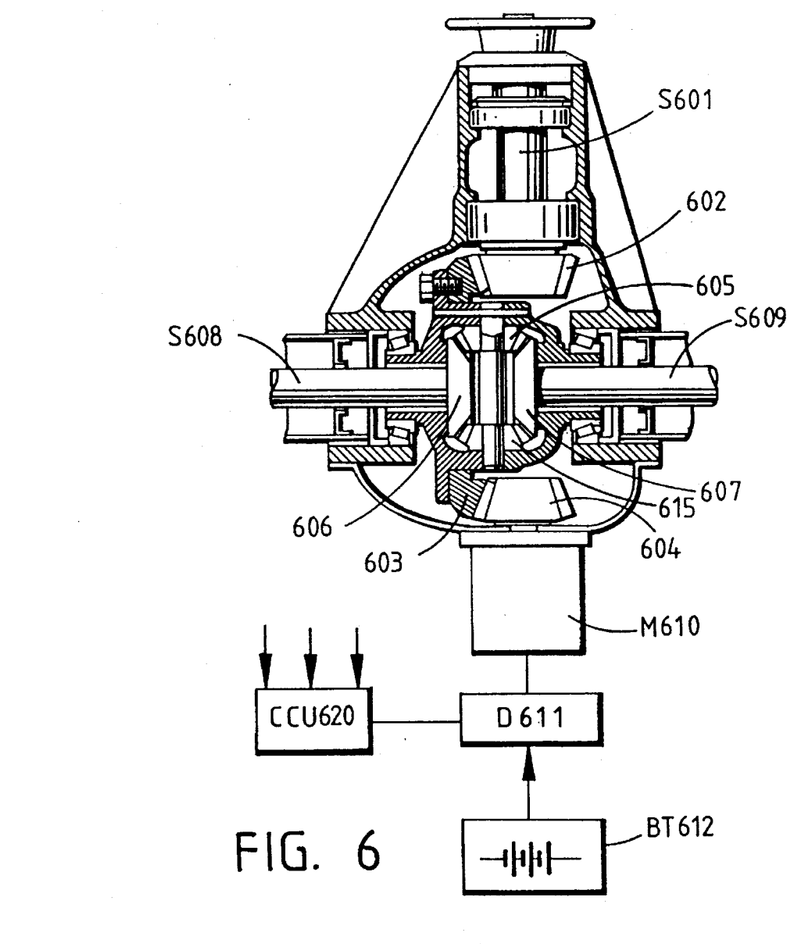
FIG. 6 illustrates another embodiment of the invention incorporated in a differential gearing unit.

FIG. 6 is an embodiment of the differential coupling and compounding power system of electric transmission storing type which can drive an engine power system through a load control value-gaining torsional force of an auxiliary dynamo. This embodiment has a trait that the smaller the load the higher the speed, a mechanic trait of series wound, or auxiliary multiple wound auxiliary dynamo, or a current value controlled (including constant current control) A.C. or D.C. brush or brushless dynamo so as to have a function of a control value increasing according to the load to have the function of increasing the torsional moment:

This system is comprised of the following:

Gyroscopic power source: a power source from engine or other gyroscopic power source, it has a clutch between the input shaft S601 and itself, or other transmission gear which should be in idle state;

input shaft S601: It can receive the driving from engine or other gyroscopic power source, and its small gear 602 is matched with the big gear 603;

input big gear 603: It can connect and move two units of differential gear units 605, 615 and is matched with the second small gear 604 so as to help dynamo M610 to act power coupling;

left side differential gear 606: It provides a drive left output shaft S608;

right side differential gear 607: It provides a drive right output shaft S609;

auxiliary dynamo M610: It can receive the driving from the driver D611, the driver D611 is controlled by CCU620, it controls the following functions according to the driving operative situation (e.g. turning speed, oil exhausted, and order value of the total driving need) of the primary side:

(1) battery BT612 provides the power for dynamo output;

(2) used as a generator to charge the battery;

(3) idle;

The auxiliary dynamo has a trait that the smaller the load the higher the speed, a mechanic trait of series wound, or auxiliary multiple wound auxiliary dynamo, or a current value controlled (including constant current control) A.C. or D.C. brush or brushless dynamo so as to have a function of a control value increasing according to the load to have the function of increasing the torsional moment;

driver for dynamo driving D611: the driver D611 is controlled by CCU620 to control the control auxiliary dynamo, it is composed of a dynamo element or a solid element or both of them;

central control unit CCU620: it sends the relative orders to the driver D61 according to the total system output operative orders and according to the primary side operative situation (e.g. turning speed, oil exhausted, and order value of the total driving need);

battery BT612: it is a battery which can charge or discharge power, it can be chosen from any kinds of charge/discharge secondary battery or fuel battery;

By means of the above system, it becomes a useful, better and a more effective compound power system.

In practical use, this dynamo can be coupled to the input big gear of the differential gear or coupled more adjacent to the engine primary side, and by means of the transmission element and primary side gyroscopic shaft coupling, it can operate as follows:

primary side is open (e.g. between input shaft, the clutch is loose or the operative transmission gear is idle), and uses power from battery to drive auxiliary dynamo for the motor driving load;

when primary side gyroscopic is input, it uses auxiliary dynamo to control the current and to adjust the auxiliary torsional moment of the primary side;

auxiliary dynamo is open and is driven and operated by the primary side;

In addition, it can have the following functions:

when primary side is in light load input, or in need of reducing speed, the auxiliary dynamo is in a state of generating power to charge the battery and produce a damping.

Figure 6A:
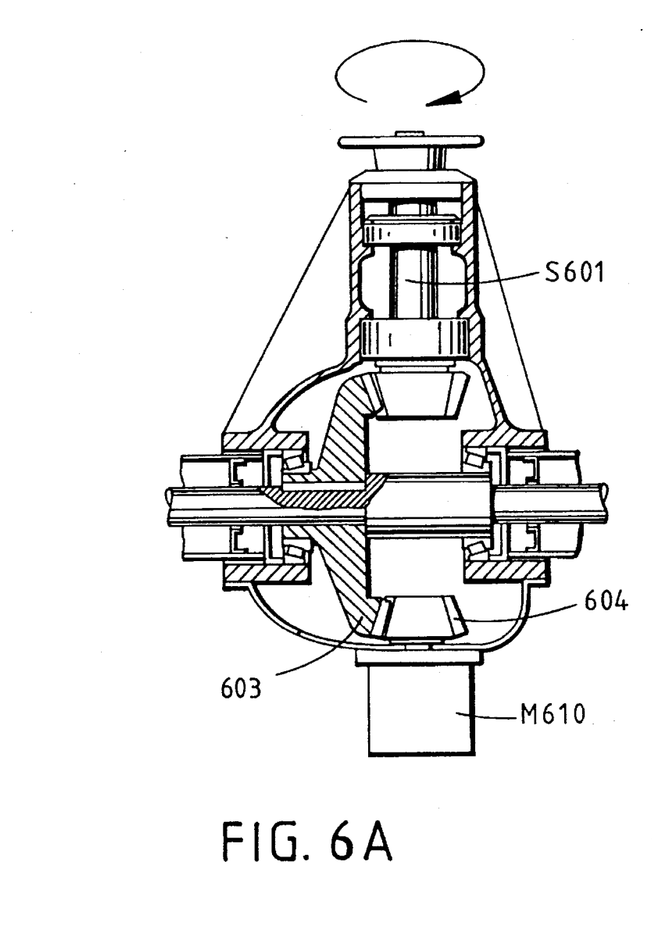
FIG. 6A illustrates a still other output shaft drive arrangement incorporating a differential coupling and compound power system in accordance with the present invention.

If the rear end load side of this system is driven by an output shaft, as shown in FIG. 6A, an embodiment of the system in FIG. 6 of which its rear end load side is provided for driving a soly output shaft, it is different from the FIG. 6 because the input big gear 603 is directly connected to the input shaft S601 and the primary differential gear is omitted, and the auxiliary dynamo M610 still uses the second small gear 604 to match with the big gear 603.

Figure 7:
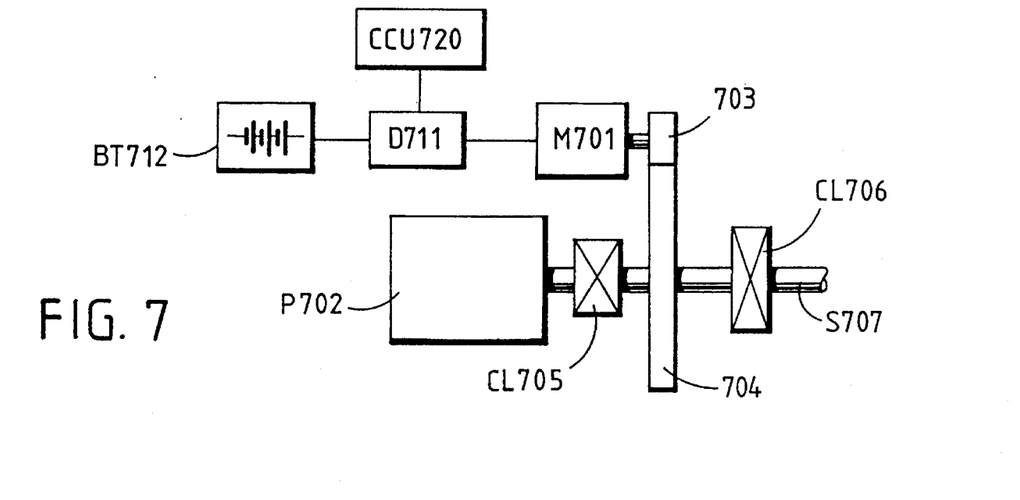
FIG. 7 schematically depicts a differential coupling and compound power system having an auxiliary dynamo gearing arrangement intermeshed with a gear attached to an output shaft of an engine.

In addition, as show in FIG. 7, the system can use engine primary side gear to match with the auxiliary dynamo gear to from a multiple power system of electric power storing differential coupling, this system is in series and there provided a clutch CL705 between engine P702 and output big gear 704: if the output end of the engine and the auxiliary dynamo have a clutch CL706 (or the transmission box has a idle clutch), and if the motive power of the output shaft S707 is cut off, the auxiliary dynamo can start the engine or the engine can start the generator to produce power for charging the battery; it has a dynamo driving driver D711 controlled by the order of the CCU720 to control the auxiliary dynamo, it consists of dynamo element or solid element or both of them, it also has a CCU720 which sends the relative order s to the driver D711 according to the total system output operative orders and according to the primary side operative situation (e.g. turning speed, oil exhausted, and order value of the total driving need); it also has a battery BT712 which can charge or discharge power, it can be chosen from any kinds of charge/discharge secondary battery or fuel battery; this system has the following traits:

auxiliary dynamo M701 has a trait that the smaller the load the higher the speed, a mechanic trait of series wound, or auxiliary multiple wound auxiliary dynamo, or a current value controlled (including constant current control) A.C. or D.C. brush or brushless dynamo so as to have a function of a control value increasing according to the load to have the function of increasing the torsional moment, it also uses the small gear 703 to match with the big gear 704.

Figure 8:
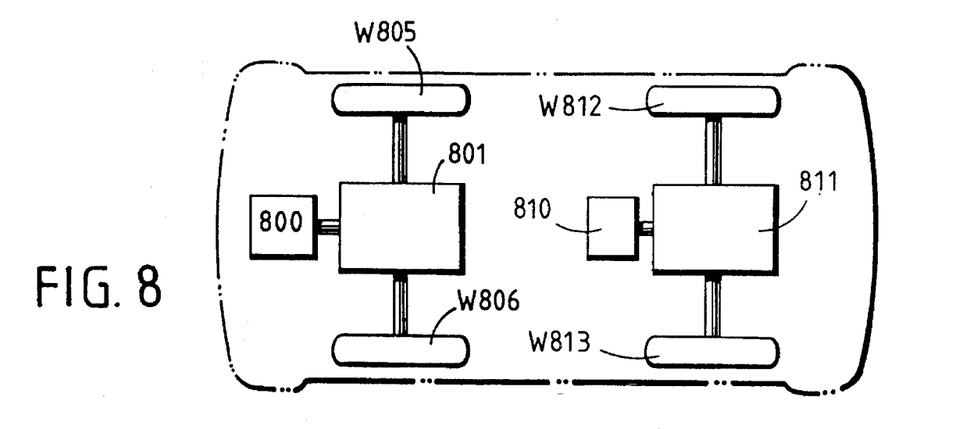
FIG. 8 illustrates a multi-wheel driven vehicle having separate driving arrangements for front and rear wheel sets.

By means of the engine-driving power source and the driving motor which will increase its speed when it is reducing its load, the differential coupling and compounding power system of electric transmission storing type can accomplish its compound driving in its motion, FIG. 8 is an embodiment of the front motor and the driving motor which will increase its speed when it is reducing back load for the differential coupling and compounding power system of electric transmission storing type, it mainly includes:

front motor 800: it constructed by gasoline, diesel, or other fuel internal combustion engine for driving two front wheels W805, 806 by a transmission mechanism 801;

back motor 810: it is a motor 810 which can increase its speed when it is reducing its load, it is constituted by series exciting motor, auxiliary dual exciting motor, motor driven by predefined current, or other motor which can increase its speed when it is reducing its load, or DC/AC brush/brushless dynamo which can be controlled (including the constant current control) by the current value, it can bring forth an auxiliary torsion directly or by a load transformation of the differential slowing gears 811 to help the load driving function to drive the rear wheels W812, W813.

Figure 8A:
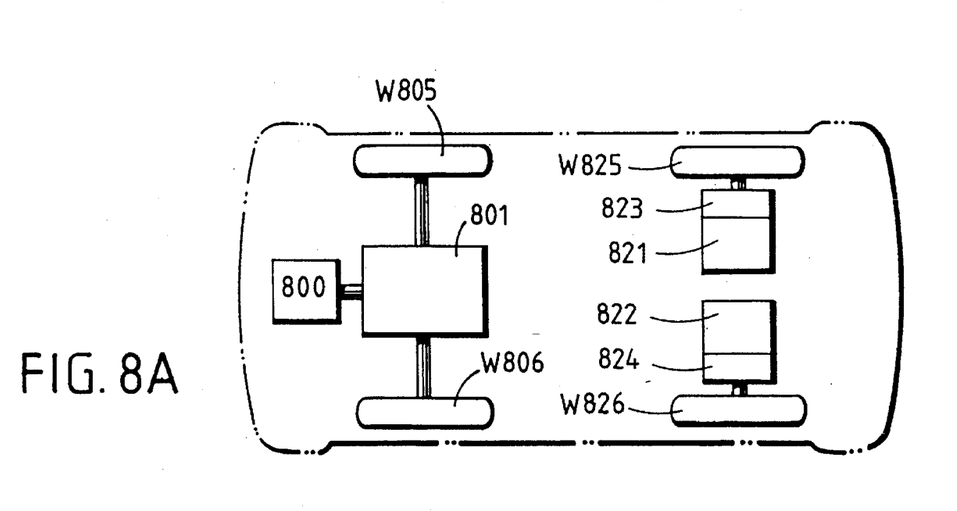
FIG. 8A illustrates an embodiment of the invention incorporated in a vehicle having a first drive system for a front wheel set and a pair of driving units for a rear wheel set.

FIG. 8A is an embodiment of the differential coupling and compounding power system of electric transmission storing type of which the driving motor is speeding when its front engine and rear wheel is reducing its load, its main components are as follows:

front motor 800: it constructed by gasoline, diesel, or other fuel internal combustion engine for driving two front wheels W805, W806 by a transmission mechanism 801;

back motor: it is a motor which can increase its speed when it is reducing its load, it is constituted by series exciting motor, auxiliary dual exciting motor, motor driven by predefined current, or other motor which can increase its speed when it is reducing its load, or DC/AC brush/brushless dynamo 821, 822 which can be controlled (including the constant current control) by the current value, it can bring forth an auxiliary torsion directly or by a load transformation of the differential slowing gears 823, 824 to help the load riving function to drive the rear wheels W825, W826.

Figure 8B:
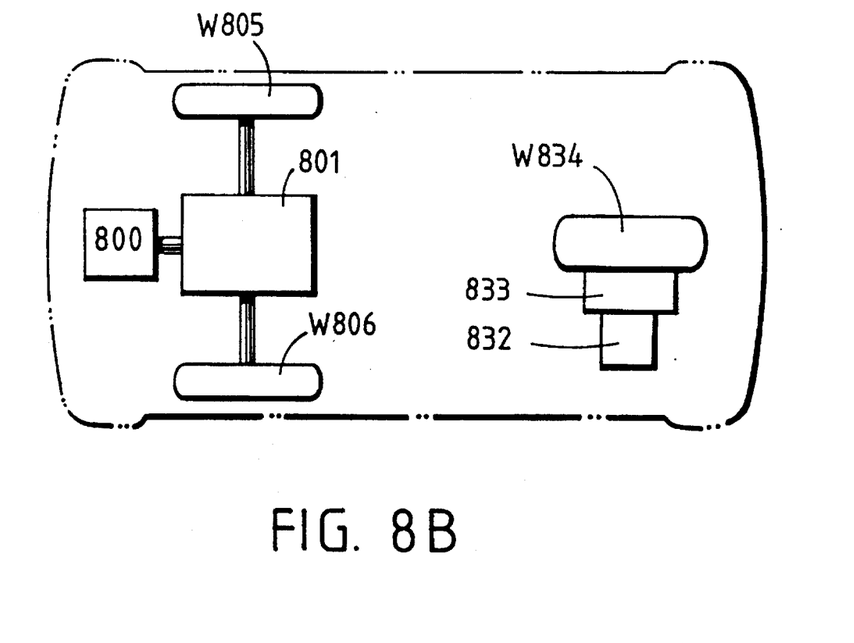
FIG. 8B illustrates a vehicle having three wheels with different driving arrangements for the front and rear wheels.

FIG. 8B is an embodiment of the differential coupling and compounding power system of electric transmission storing type of which the driving motor is speeding when its front engine and its single rear wheel is reducing its load, its main components are as follows:

front motor 800: it constructed by gasoline, diesel, or other fuel internal combustion engine for driving two front wheels W805, 806 by a transmission mechanism 801;

back motor 832: it is a motor 832 which can increase its speed when back driving single rear wheel W834 is reducing its load, it is constituted by series exciting motor, auxiliary dual exciting motor, motor driven by predefined current, or other motor which can increase its speed when it is reducing its load, or DC/AC brush/brushless dynamo which can be controlled (including the constant current control) by the current value, it can bring forth an auxiliary torsion directly or by a load transformation of the differential slowing gears 833 to help the load driving function to drive the rear wheels.

The feature of FIG. 8, FIG. 8A, and FIG. 8B including:

(1) drive the carrier with internal combustion engine;

(2) drive the carrier with electric power motor to move forward or backward;

(3) (1) and (2) are driven at the same time;

(4) use power motor to start and to carry engine in cruise so as to start it, and continue to run;

(5) when the engine stops, motor turns to charge the battery by the dynamo;

(6) when the engine is driving, motor turns to charge the battery by the dynamo;

As shown in FIG. 8, FIG. 8A, and FIG. 8B, the battery of the system can be the conventional Pb acid Ni Cd Ni H or other chargable battery, motor controller controls the motor to run and controls the current positive/negative rotation or speed adjustment as the generator.

Figure 9:
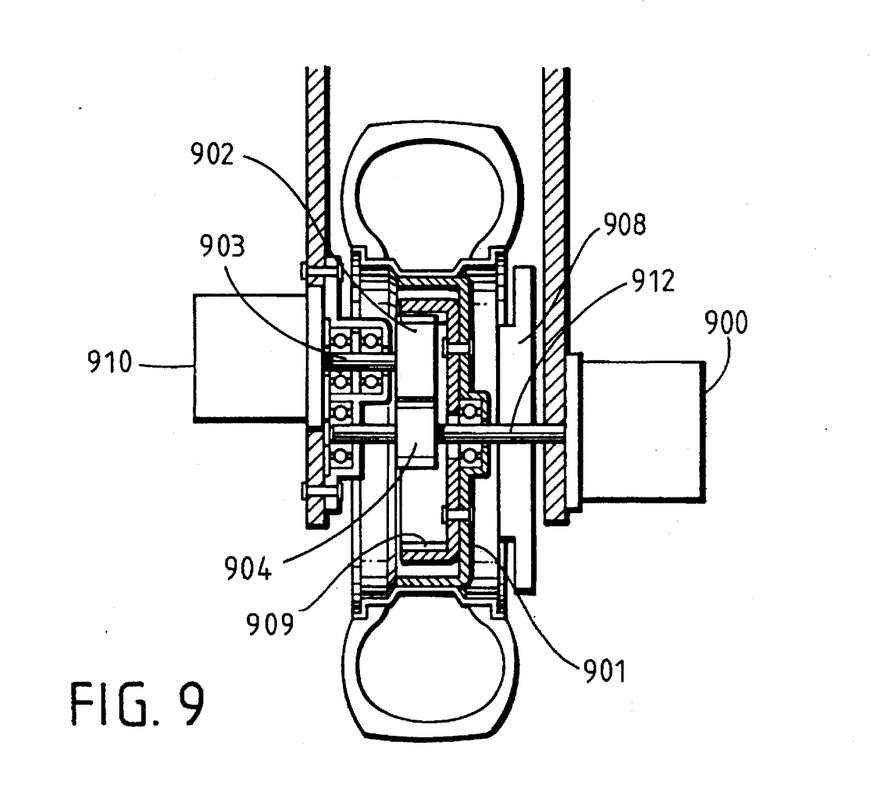
FIG. 9 illustrates an embodiment of the differential coupling and compound power system of the present invention providing for both an engine and electric motor drive directly at a single vehicle wheel.

In practical use, the differential coupling and compounding power system of electric transmission storing type can further implement the differential energy-storing compound driving by the engine and the motor to drive the same wheel, FIG. 9 is an embodiment of the differential coupling and compounding power system of electric transmission storing type which is applied to the engine and motor driving the same wheel, it mainly uses the first small gear 902 in hub 901 of the ring gear 909, the first input shaft 903 coupled to the small gear 902 is not coaxial with the wheel hub 901, then the second small gear 904, which is coaxial with the wheel, is connected with the first gear 902, and the first and second gears 902, 904 are respectively connected from right and left side to the power motor 910 and engine 900 to construct a compound power system, its main components are as follows:

wheel hub 901: it is a ring tire or a directly formed wheel with a ring gear 909 and braking device 908 and are coaxially inserted in core shaft 912, the hub 901 can rotate freely around the core shaft 912 and can control the brake of the braking device 908;

mandrel 912: it is connected from its single side or both sides with the brackets of the machine, and a second small gear 904 is disposed on the mandrel 912, which can rotate freely and receive engine 900 or can be driven by electric motor device 910;

the first small gear 902: it is used to match with the ring gear 909 of the hub 901 and is directly matched with the second gear 904, or moved with the second small gear 904 through the middle gears, and is connected to the first input shaft 903, and the first input shaft 903 is used to connect with the engine or is driven by the power motor;

the core shaft 912 and the first input shaft 903 are respectively connected from their right and left side to couple with the power device from different direction;

power device: it includes a power motor 910 and the internal combustion engine 900 which are respectively jointed with the core shaft on both sides of the hub 901 and the input end of the first input shaft 903, the engine 900 is constructed by the gasoline, diesel, or other fuel internal combustion engine; the motor is a motor 910 which can increase its speed when it is reducing its load, it is constituted by series exciting motor, auxiliary dual exciting motor, motor driven by predefined current, or other motor which can increase its speed when it is reducing its load, or DC/AC brush/brushless dynamo which can be controlled (including the constant current control) by the current value, it can bring forth an auxiliary torsion directly or by a load transformation of the differential slowing gears to help the load driving function;

between the engine 900 in the power device and the input end of the core shaft 912, there disposed a centrifugal clutch, or a clutch controlled manually, electrically, and mechanically;

the small gear 902 on the first input shaft 903 can be directly matched with the second small gear 904 of the core shaft 912, or between the first input shaft 903 and the second small gear 904, there disposed a middle wheel to change the speed ratio.

The functions of the present invention are as follows:

(1) drive only with engine;

(2) drive only with electric power motor;

(3) it is a motor which can increase its speed when it is reducing its load, it is constituted by series exciting motor, auxiliary dual exciting motor, motor driven by predefined current, or other motor which can increase its speed when it is reducing its load, or DC/AC brush/brushless dynamo which can be controlled (including the constant current control) by the current value, it can bring forth an auxiliary torsion directly or by a load transformation of the differential slowing gears to help the load driving function to drive the rear wheels;

(4) use the electric motor to supply a power recycling motive energy for electric brake, so that the motive energy can be recovered to charge the power energy into the storing battery and get brake damper;

(5) use engine to drive motor as a dynamo so as to charge the battery.

The system, differential coupling and compounding power system of electric transmission storing type, can be applied to car wheels, ships, or other solid multiple driving power; the above-mentioned embodiments in FIG. 1–9 are to illustrate all kinds of applications of the invention, the differential coupling and compounding power system of electric transmission storing type; but in practical use, the readers can choose its circumferential parts for your need.

I claim:

1. A differential coupling and compounding power system comprising:

a primary, gyroscopic power source having an output shaft interconnected with a rotatable member of a vehicle for rotatably driving said member;

means for controlling the output power of said power source;

a magnetic coupling and driving device drivingly connected to the output shaft of said primary, gyroscopic power source and to said rotatable member;

a battery unit electrically connected to said magnetic coupling and driving device;

control means for selectively operating said differential coupling and compounding power system in various operating modes including a first operating mode wherein said primary, gyroscopic power source solely drives said rotatable member, a second operating mode wherein said magnetic coupling and driving device solely drives said rotatable member and a third operating mode wherein both said primary gyroscopic power source and said magnetic coupling and driving device drive said rotatable member simultaneously; and a differential gear unit having an associated output that is connected to said rotatable member, the output shaft of said primary, gyroscopic power source and said magnetic coupling and driving device being drivingly connected to said differential gear unit such that said differential gear unit adjustably proportions a torque applied to said rotatable member between said primary, gyroscopic power source and said magnetic coupling and driving device.

2. A differential coupling and compounding power system according to claim 1, wherein said differential gear unit is located between the output shaft of said primary, gyroscopic power source and said magnetic coupling and driving device.

3. A differential coupling and compounding power system as claimed in claim 1, wherein said control means for selectively operating said differential coupling and compounding power system includes means for operating said magnetic coupling and driving device as a generator for charging said battery unit.

4. A differential coupling and compounding power system as claimed in claim 3, wherein said control means for selectively operating said differential coupling and compounding power system includes means for operating said magnetic coupling and driving device as a starter unit for developing an initial starting inertia for said primary, gyroscopic power source.

5. A differential coupling and compounding power system as claimed in claim 4, wherein said control means for selectively operating said differential coupling and compounding power system includes means for operating said magnetic coupling and driving device as a brake acting on the output shaft of said primary, gyroscopic power source.

6. A differential coupling and compounding power system as claimed in claim 1, wherein said magnetic coupling and driving device comprises an electric motor.

7. A differential coupling and compounding power system as claimed in claim 6, wherein said electric motor is concentrically mounted about the output shaft of said primary, gyroscopic power source, between said primary, gyroscopic power source and said rotatable member.

8. A method of operating a differential coupling and compounding power system having a primary, gyroscopic power source with an output shaft interconnected with a rotatable member of a vehicle for rotatably driving the member, a battery unit and a magnetic coupling and driving device electrically connected to the battery unit and drivingly connected to the rotatable member comprising the steps of:

utilizing said magnetic coupling and driving device as a starter unit for developing an initial starting inertia for said primary, gyroscoping power source; and operating said differential coupling and compounding power system in a first operating mode wherein said primary, gyroscopic power source solely drives said rotatable member, a second operating mode wherein said magnetic coupling and driving device solely drives said rotatable member and a third operating mode wherein both said primary, gyroscopic power source and said magnetic coupling and driving device drive said rotatable member simultaneously.

9. A method of operating a differential coupling and compounding power system according to claim 8, further comprising the step of operating said magnetic coupling and driving device as a brake on said primary, gyroscopic power source.

10. A method of operating a differential coupling and compounding power system according to claim 9, further comprising the step of operating said magnetic coupling and driving device as an alternator to charge said battery.

11. A differential coupling and compounding power system comprising:

a primary, gyroscopic power source having an output shaft interconnected with a rotatable member of a vehicle for rotatably driving said member;

means for controlling the output power of said power source;

a magnetic coupling and driving device drivingly connected to the output shaft of said primary, gyroscopic power source and to said rotatable member, said magnetic coupling and driving device being concentrically mounted about the output shaft of said primary, gyroscopic power source between said primary, gyroscopic power source and said rotatable member;

a battery unit electrically connected to said magnetic coupling and driving device; and control means for selectively operating said differential coupling and compounding power system in various operating modes including a first operating mode wherein said primary, gyroscopic power source solely drives said rotatable member, a second operating mode wherein said magnetic coupling and driving device solely drives said rotatable member and a third operating mode wherein both said primary gyroscopic power source and said magnetic coupling and driving device drive said rotatable member simultaneously.

12. A differential coupling and compounding power system according to claim 11, further comprising a differential gear unit having an associated output that is connected to said rotatable member, the output shaft of said primary, gyroscopic power source and said magnetic coupling and driving device being drivingly connected to said differential gear unit such that said differential gear unit adjustably proportions a torque applied to said rotatable member between said primary, gyroscopic power source and said magnetic coupling and driving device.

13. A differential coupling and compounding power system as claimed in claim 11, wherein said control means for selectively operating said differential coupling and compounding power system includes means for operating said magnetic coupling and driving device as a generator for charging said battery unit.

14. A differential coupling and compounding power system as claimed in claim 13, wherein said control means for selectively operating said differential coupling and compounding power system includes means for operating said magnetic coupling and driving device as a starer unit for developing an initial starting inertia for said primary, gyroscopic power source.

15. A differential coupling and compounding power system as claimed in claim 14, wherein said control means for selectively operating said differential coupling and compounding power system includes means for operating said magnetic coupling and driving device as a brake acting on the output shaft of said primary, gyroscopic power source.

16. A differential coupling and compounding power system as claimed in claim 11, wherein said magnetic coupling and driving device comprises an electric motor.

* * * * *